June 14, 1955  D. M. LIPPI  2,710,593
NIPPLE GUARD
Filed July 23, 1954

Dominic M. Lippi
INVENTOR.

United States Patent Office 2,710,593
Patented June 14, 1955

2,710,593

NIPPLE GUARD

Dominic M. Lippi, Luverne, Minn., assignor to Norwood Products Company, Luverne, Minn., a corporation of Minnesota Application July 23, 1954, Serial No. 445,249

8 Claims. (Cl. 119—71)

This invention relates to a nipple guard adapted to be used in conjunction with an animal feeding tank such as that apparatus disclosed in the patent to E. O. Rue, Patent No. 2,678,026.

The primary object of the present invention resides in the provision of a nipple guard for use in conjunction with feeding tanks such as are used in feeding baby pigs, lambs and calves liquid food through rubber and synthetic nipples which will protect and guard the nipples to the extent that it is impossible for the baby animal to utilize its molar teeth to pierce or rip the nipples when the guard is in position and when the baby animal is taking nourishment.

The construction of this invention features the use of a channel shaped guard having legs spaced sufficiently apart to permit the nipple to be grasped only by the baby pig, lamb, or calf from a point directly in front of the nipple. Thus, since the nipple does not extend past the guard a sufficient distance to permit the animal to bite on the shoulder of the nipple, the animal will be prevented from tearing holes in the nipple.

A further object of the invention resides in the provision of a nipple guard which is adapted to be detachably secured to a feeding tank that which once in place will permit the ready exchange of nipples as may be desired.

A further feature of the invention lies in the novel means provided for centering and supporting the nipple guard in position which includes integrally formed support tabs adapted to be secured to the nipple holder and a lower tab adapted to be bent about the lower portions of the feeding tank.

Still further objects and features of this invention reside in the provision of a nipple guard that is strong and durable, capable of being readily installed on various existing feeding tanks, which can be made in any convenient shape and size, and which is inexpensive to manufacture thereby permitting wide distribution and utilization.

These, together with the various ancillary objects and features of the invention which will become apparent as the following description proceeds, are attained by this nipple guard, a preferred embodiment of which has been illustrated in the accompanying drawings, by way of example only, wherein.

Figure 1:
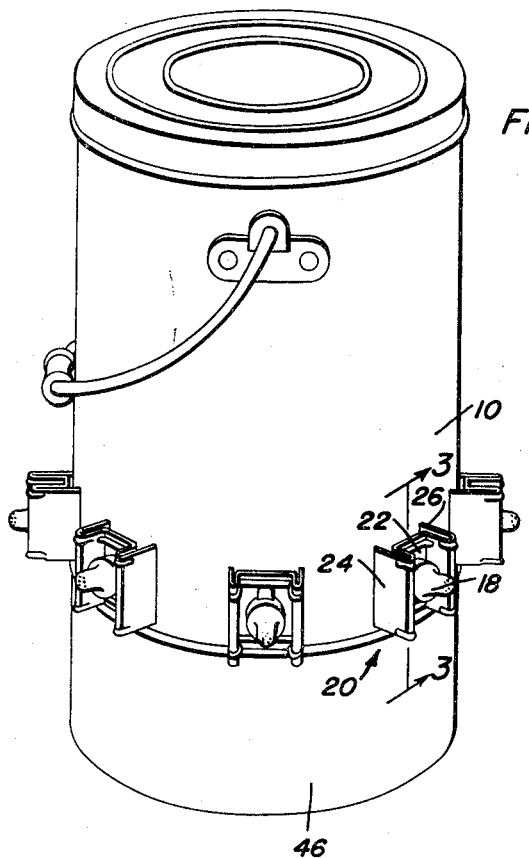
Figure 1 is a perspective view of the nipple guard shown installed on a feeding tank.
Figure 2:
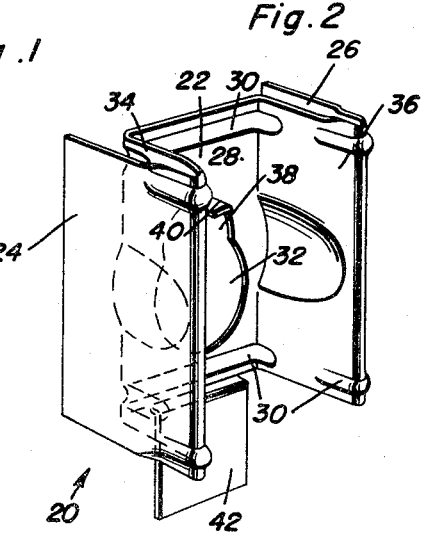
Figure 2 is another perspective view of the nipple guard on an enlarged scale.
Figure 4:
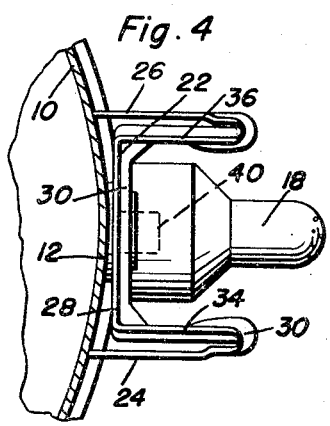
Figure 4 is a horizontal sectional view through the feeding tank illustrating the nipple guard in planned view.
Figure 3:
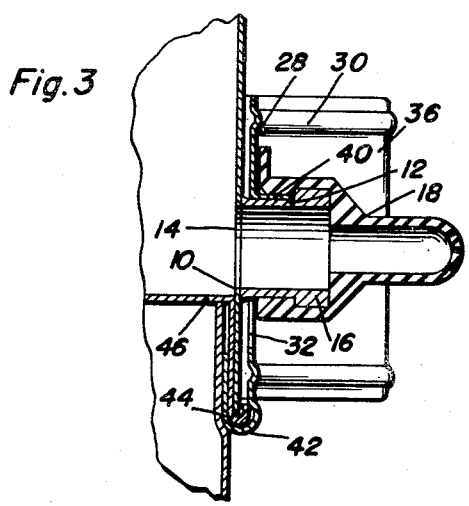
Figure 3 is an enlarged vertical sectional view as taken along the plane of line 3—3 in Figure 1 illustrating the manner in which the nipple seats on the support tab of the nipple guard.

With continuing reference to the accompanying drawings wherein like reference numerals designate similar parts throughout the various views, reference numeral 10 generally designates a feeding tank having a plurality of nipple holders 12 secured thereto in alignment with liquid outlets 14 formed in the tank 10. The nipple holders 12 are provided with outer peripheral rings 16 of enlarged dimensions for enabling nipples 18 to be readily secured and held in position thereon.

The nipple holders comprising the present invention are generally designated by reference numeral 20 and include generally channel shaped members 22 to which inwardly extending flanges 24 and 26 are integrally attached, the flanges 24 and 26 being adapted to abut against the outer surface of the tank 10 to hold the central portion 28 of the nipple guard 22 in spaced relationship from the tank 10. Pressed in the channel shaped member 22 and the flanges 24 and 26 are ribs as at 30 above and below a keyhole shaped aperture 32 formed in the central connecting portion of the channel shaped member 28. The ribs 30 serve to reinforce the angulated connections between the central connecting portion 28 and the leg portions 34 and 36 of the channel shaped member 22 and further serve to rigidify the connection between the flanges 24 and 26 and the leg portions 34 and 36 respectively. In addition, the ribs 30 will serve to limit the motion of the mouth of the baby animal taking nourishment.

Integrally formed with the smaller upper portion 38 of the keyhole shaped aperture 32 is a support tab 40 which is adapted to seat on the nipple holder 12 inwardly of the rings 16. Thence, when the nipple 18 is positioned over the ring 16 it will overlie the tab 30 to hold the nipple guard 20 in position. Further, integrally formed with the lower edge of the central contacting portion 28 and of smaller width than the central connecting portion 28 is a tab 42 which is adapted to be folded under and behind the lower edge 44 of the tank 10. The tank 10 is adapted to be seated on a heating unit 46 and the tab 42 therefor in conjunction with the flanges 24 and 26 and the support tab 40 locks the guard 20 detachably in position.

When a baby pig, lamb, or calf utilizes the feeding tank 10 the nipple guard 20 will prevent the baby animal from biting on the nipples 18 with their molar teeth thereby assuring against much of the destruction of the nipples 18 that would otherwise occur. With the nipple guard 20 in place, individual nipples 18 may be removed for cleaning or replacement. The guard may be left off at the start of the nursing period thereby making it easier for the baby animals to find the nipples and start feeding. After the baby animals have become accustomed to the feeder, usually after a day or two, the guards 20 may be installed and nipple replacement will be greatly reduced.

Since from the foregoing, the construction and advantages of this nipple guard are readily apparent, further description is believed to be unnecessary.

However, since numerous modifications will readily occur to those skilled in the art after a consideration of the foregoing specification and accompanying drawing, it is not intended to limit the invention to the precise embodiment shown and described, but all suitable modifications and equivalents may be readily resorted to which fall within the scope of the appended claims.

What is claimed as new is as follows:

1. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank, said channel shaped member having an aperture therethrough adapted to receive a nipple holder.

2. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank, said channel shaped member having an aperture therethrough adapted to receive a nipple holder, and a tab integrally formed with said channel shaped member and engageable with said feeding tank.

3. A nipple guard for use with feeding tank having a plurality of nipple holders and nipples mounted on said nipple holder comprising a substantially channel shaped member having a pair of inwardly extending flanges secured thereto, said flanges being adapted to engage the feeding tank, said channel shaped member having an aperture therethrough adapted to receive a nipple holder, said aperture being of substantially keyhole shape having an upper portion of smaller diameter.

4. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank, said channel shaped member having an aperture therethrough adapted to receive a nipple holder, and a support tab integrally formed with said channel shaped member extending outwardly therefrom adjacent the upper portion of said aperture, said support tab being adapted to seat on said nipple holder.

5. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank, said channel shaped member having an aperture therethrough adapted to receive a nipple holder, and a tab integrally formed with said channel shaped member and engageable with said feeding tank, said aperture being of substantially keyhole shape having an upper portion of smaller diameter.

6. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank, said channel shaped member having an aperture therethrough adapted to receive a nipple holder, and a tab integrally formed with said channel shaped member and engageable with said feeding tank, and a support tab integrally formed with said channel shaped member extending outwardly therefrom adjacent the upper portion of said aperture, said support tab being adapted to seat on said nipple holder.

7. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank said channel shaped member having an aperture therethrough adapted to receive a nipple holder, and a tab integrally formed with said channel shaped member and engageable with said feeding tank, said aperture being of substantially keyhole shape having an upper portion of smaller diameter, and a support tab integrally formed with said channel shaped member extending outwardly therefrom adjacent the upper portion of said aperture, said support tab being adapted to seal on said nipple holder.

8. A nipple guard for use with a feeding tank having a plurality of nipple holders and nipples mounted on said nipple holders comprising a substantially channel shaped member having a pair of inwardly extending flanges secured thereto, said flanges being adapted to engage the feeding tank, said channel shaped member having an aperture therethrough adapted to receive a nipple holder, said channel shaped member and said flanges having outwardly extending ribs above and below said aperture.

References Cited in the file of this patent

UNITED STATES PATENTS

| Number | Name | Date |
|---|---|---|
| 1,935,144 | Coyner | Nov. 14, 1933 |
| 2,044,312 | Laufer | June 16, 1936 |

FOREIGN PATENTS

| Number | Country | Date |
|---|---|---|
| 25,080 | Great Britain | A. D. 1903 |